(12) United States Patent
Beck et al.

(10) Patent No.: US 10,677,747 B2
(45) Date of Patent: Jun. 9, 2020

(54) HUMIDITY SENSOR (71) Applicant: Honeywell International Inc., Morris Plains, NJ (US)

(72) Inventors: Scott E. Beck, Murphy, TX (US); Brian G. Moffat, Edinburgh (GB)

(73) Assignee: Honeywell International Inc., Morris Plains, NJ (US)

( * ) Notice: Subject to any disclaimer, the term of this patent is extended or adjusted under 35 U.S.C. 154(b) by 308 days.

(21) Appl. No.: 15/551,841

(22) PCT Filed: Feb. 17, 2016

(86) PCT No.: PCT/US2016/018355
§ 371 (c)(1),
(2) Date: Aug. 17, 2017

(87) PCT Pub. No.: WO2016/134079
PCT Pub. Date: Aug. 25, 2016

(65) Prior Publication Data
US 2018/0031510 A1    Feb. 1, 2018

Related U.S. Application Data (60) Provisional application No. 62/117,208, filed on Feb. 17, 2015.

(51) Int. Cl.
G01N 27/22    (2006.01)

(52) U.S. Cl.
CPC ............................. G01N 27/225 (2013.01)

(58) Field of Classification Search
CPC ..................................... G01N 27/225
USPC ........................................ 73/335.04
See application file for complete search history.

(56) References Cited

U.S. PATENT DOCUMENTS

| 4,057,823 A | 11/1977 | Burkhardt et al. |
| 4,247,299 A * | 1/1981 | Klein ............ G01N 27/60 340/629 |
| 4,366,709 A | 1/1983 | Eiermann et al. |
| 4,429,343 A | 1/1984 | Freud |

(Continued)

FOREIGN PATENT DOCUMENTS

| CN | 1455250 A | 11/2003 |
| CN | 1651910 A | 8/2005 |

(Continued)

OTHER PUBLICATIONS

International Application No. PCT/US2016/018355, International Search Report, dated May 12, 2016, 4 pages.

(Continued)

Primary Examiner — Tarun Sinha
(74) Attorney, Agent, or Firm — Craige Thompson; Thompson Patent Law (57) ABSTRACT Humidity sensors may exhibit a relatively small amount of hysteresis and/or a faster response time. In some cases, a humidity sensor may include a polymeric humidity sensing layer disposed over an electrode layer. The polymeric humidity sensing layer may include a halogenated layer disposed over the polymeric humidity sensing layer. The polymeric humidity sensing layer may, for example, include a polyimide and the halogenated layer may include a monolayer or less than a monolayer of a halogenated material such as a fluorinated material.

5 Claims, 11 Drawing Sheets (56) References Cited

U.S. PATENT DOCUMENTS

| | | |
|---|---|---|
| 4,470,096 A | 9/1984 | Guertin |
| 4,564,228 A | 1/1986 | Kohlen |
| 4,564,882 A | 1/1986 | Baxter et al. |
| 4,638,346 A | 1/1987 | Inami et al. |
| 4,938,995 A * | 7/1990 | Giordano ............... B05D 1/62 427/490 |
| 5,161,085 A | 11/1992 | Sakai et al. |
| 5,408,381 A | 4/1995 | Thoma et al. |
| 5,529,279 A | 6/1996 | Beatty et al. |
| 5,535,633 A | 7/1996 | Kofoed et al. |
| 5,702,773 A | 12/1997 | Endo |
| 5,780,121 A | 7/1998 | Endo |
| 5,795,655 A | 8/1998 | Endo |
| 6,150,681 A | 11/2000 | Allen |
| 6,222,376 B1 | 4/2001 | Tenney, III |
| 6,245,489 B1 | 6/2001 | Baklanov et al. |
| 6,470,741 B1 | 10/2002 | Fathollahzadeh |
| 6,614,241 B2 | 9/2003 | Schmitt et al. |
| 6,615,667 B2 | 9/2003 | Smith |
| 6,647,782 B2 | 11/2003 | Toyoda |
| 6,658,946 B2 | 12/2003 | Lipscomb et al. |
| 6,690,569 B1 | 2/2004 | Mayer et al. |
| 6,724,612 B2 | 4/2004 | Davis et al. |
| 6,867,602 B2 | 3/2005 | Davis et al. |
| 6,945,123 B1 | 9/2005 | Kuehl et al. |
| 7,042,091 B2 | 5/2006 | Baklanov et al. |
| 7,111,518 B1 | 9/2006 | Allen et al. |
| 7,115,531 B2 | 10/2006 | Shaffer, II et al. |
| 7,176,700 B2 | 2/2007 | Itakura et al. |
| 7,233,000 B2 | 6/2007 | Nassiopoulou et al. |
| 7,278,309 B2 | 10/2007 | Dmytriw et al. |
| 7,280,927 B1 | 10/2007 | Dmytriw |
| 7,493,822 B2 | 2/2009 | Stewart et al. |
| 7,563,692 B2 | 7/2009 | Fortin et al. |
| 7,635,091 B2 | 12/2009 | Engler et al. |
| 7,678,600 B2 | 3/2010 | Villa et al. |
| 7,683,636 B2 | 3/2010 | Alimi et al. |
| 7,703,339 B2 | 4/2010 | Sulouff, Jr. et al. |
| 7,710,128 B2 | 5/2010 | Alimi et al. |
| 7,713,772 B2 | 5/2010 | Vanha et al. |
| 7,769,557 B2 | 8/2010 | Bey et al. |
| 7,924,028 B2 | 4/2011 | Alimi et al. |
| 8,047,074 B2 | 11/2011 | Jun et al. |
| 8,104,355 B2 | 1/2012 | Minamitani et al. |
| 8,601,879 B2 | 12/2013 | Okada |
| 8,616,065 B2 | 12/2013 | Stewart et al. |
| 8,975,671 B2 | 3/2015 | Ten Have |
| 9,080,907 B2 | 7/2015 | Haneef et al. |
| 9,156,676 B2 | 10/2015 | Stewart et al. |
| 9,513,242 B2 | 12/2016 | Beck et al. |
| 2003/0010119 A1 | 1/2003 | Toyoda |
| 2004/0008471 A1 | 1/2004 | Davis et al. |
| 2004/0177685 A1 | 9/2004 | Yokura et al. |
| 2007/0251292 A1 | 11/2007 | Beck et al. |
| 2008/0134753 A1 | 6/2008 | Jun et al. |
| 2009/0108852 A1 | 4/2009 | Alimi et al. |
| 2010/0140669 A1 | 6/2010 | Xie |
| 2011/0107832 A1 | 5/2011 | Sakuma |
| 2011/0252882 A1 | 10/2011 | Beck et al. |
| 2012/0205653 A1 | 8/2012 | Nishikage et al. |
| 2013/0001710 A1 | 1/2013 | Daneman et al. |
| 2013/0139584 A1 | 6/2013 | Qasimi et al. |
| 2013/0139587 A1 * | 6/2013 | Le Neel ............... G01N 27/223 73/335.04 |
| 2014/0073927 A1 | 3/2014 | Chung |
| 2014/0210036 A1 | 7/2014 | Sunier et al. |
| 2014/0298913 A1 | 10/2014 | Stewart et al. |
| 2015/0021716 A1 | 1/2015 | Lee et al. |
| 2016/0077028 A1 | 3/2016 | Beck et al. |
| 2017/0328855 A1 | 11/2017 | Cobianu et al. |

FOREIGN PATENT DOCUMENTS

| | | |
|---|---|---|
| CN | 102213606 A | 10/2011 |
| CN | 101932928 B | 2/2013 |
| CN | 107449811 A | 12/2017 |
| CN | 107533027 A | 1/2018 |
| EP | 0981737 A1 | 3/2000 |
| EP | 2203738 B2 | 9/2017 |
| EP | 3244201 A1 | 11/2017 |
| EP | 3259581 A | 12/2017 |
| FR | 2991456 A1 | 12/2013 |
| JP | S60181645 A | 9/1985 |
| JP | 2003004683 A | 1/2003 |
| JP | 2009050376 A | 3/2009 |
| KR | 1020050076524 A | 7/2005 |
| WO | 2008030913 A2 | 3/2008 |
| WO | 2009055355 A3 | 4/2009 |
| WO | 2010033358 A2 | 3/2010 |
| WO | 2016040482 A1 | 3/2016 |
| WO | 2016134079 A1 | 8/2016 |

OTHER PUBLICATIONS

International Application No. PCT/US2016/018355, Written Opinion of the International Searching Authority, dated May 12, 2016, 8 pages.

Kuroiwa et al., "A Thin Film Polymide Based Capacitive Type Relative Humidity Sensor", Sensors and Actuators B: Chemical: International Journal Devoted to Research and Development of Physical and Chemical Transducers, Elsevier, S.A., CH, vol. B13, No. 1/03, May 1, 1993, pp. 89-91.

Wang et al., "On-Chip Integration of Acceleration, Pressure, and Temperature Composite Sensor with a Single-Sided Micromachining Technique," Journal of Microeletromechanical Systems, vol. 20, No. 1, pp. 42-52, Feb. 2011.

Zhang et al., "Fabrication of Thick Silicon Dioxide Layers Using DRIE, Oxidation and Trench Refill," IEEE, pp. 160-163, 2002.

International Application No. PCT/US2015/049185, International Search Report, dated Dec. 17, 2015, 4 pages.

International Application No. PCT/US2015/049185, Written Opinion of the International Searching Authority, dated Dec. 17, 2015, 8 pages.

Lee, "Fabrication and Sensing Properties of a Micro-Humidity Sensor System Using CMOS Technology," Electronic Materials Letters, vol. 6, No. 1, pp. 7-12, Mar. 31, 2010.

International Application No. PCT/US2015/049185, International Preliminary Report on Patentability, dated Mar. 14, 2017, 9 pages.

U.S. Appl. No. 14/484,821, Restriction Requirement, dated Apr. 18, 2016, 6 pages.

U.S. Appl. No. 14/484,821, Notice of Allowance, dated Jul. 28, 2016, 10 pages.

Europe Application No. 08842965.9, Decision to Grant a European patent, dated Aug. 31, 2017, 2 pages.

Europe Application No. 16169738.8, Extended European Search Report, dated Oct. 26, 2016, 7 pages.

Yamazoe N et al: "Humidity sensors: Principles and applications", Sensors and Actuators, Elsevier, Switzerland, vol. 10, No. 3-4, Nov. 12, 1986, pp. 379-398, XP026565781, ISSN: 0250-6874 DOI: 10.1016/0250-6874(86) 80055-5 [retrieved on Nov. 12, 1986].

Sung Pil Lee et al: "CMOS Humidity Sensor System Using Carbon Nitride Film as Sensing Materials", Sensors, vol. 8, No. 4, Apr. 14, 2008, pp. 2662-2672, XP055196837, ISSN: 1424-8220, DOI: 10.3390/s8042662.

Chakraborty Supratic et al: "New microhumidity field-effect transistor sensor in ppmv level", Review of Scientific Instruments, AIP, Melville, NY, US, vol. 70, No. 2, Feb. 1, 1999, pp. 1565-1567, KP012037314, ISSN: 0034-6748, DOI: 10.1063/101149625.

Europe Application No. 08842965.9, Supplementary European Search Report, dated Feb. 27, 2014, 3 pages.

Europe Application No. 08842965.9, Examination Report, dated Mar. 10, 2014, 7 pages.

Europe Application No. 08842965.9, Examination Report, dated Feb. 18, 2015, 3 pages.

(56) References Cited

OTHER PUBLICATIONS

Europe Application No. 08842965.9, Intention to Grant, dated May 12, 2017, 27 pages.
International Application No. PCT/US2016/018355, International Preliminary Report on Patentability, dated Aug. 22, 2017, 9 pages.
Europe Application No. 16708293.2, Communication pursuant to Rules 161(1) and 162 EPC, dated Oct. 17, 2017, 2 pages.
U.S. Appl. No. 11/977,799, Ex Parte Quayle, dated Jan. 22, 2009, 7 pages.
U.S. Appl. No. 11/977,799, Notice of Allowance, dated Apr. 7, 2009, 6 pages.
International Application No. PCT/US08/080586, Written Opinion of the International Searching Authority, dated May 12, 2009, 5 pages.
International Application No. PCT/US08/080586, International Preliminary Report on Patentability, dated Apr. 27, 2010, 6 pages.
China Patent Application No. 200880113107.X, First Office Action, dated Mar. 19, 2012, 8 pages.
China Patent Application No. 200880113107.X, Notification to Grant Patent Right, dated Oct. 16, 2012, 3 pages.

* cited by examiner

HUMIDITY SENSOR

CROSS-REFERENCE TO RELATED APPLICATIONS

The present application claims priority to and is the National Stage of International Application Number PCT/US2016/018355 entitled HUMIDITY SENSOR filed Feb. 17, 2016, which claims the benefit of U.S. Provisional application Ser. No. 62/117,208 filed Feb. 17, 2015 entitled SURFACE CHEMISTRY MODIFICATION OF HUMIDITY SENSING FILMS, both of which are incorporated herein by reference in their entirety.

BACKGROUND

Capacitive and resistive type humidity sensors rely on the ability of the sensing material to quickly absorb and desorb water molecules. The absorbed moisture changes the physical properties of the sensing material either by changing its resistance, permittivity, or stress, which can each directly affect the electrical response of the sensor. Bulk polyimide films are often used as the humidity sensing material in many capacitive and resistive humidity sensors. However, humidity sensors using bulk polyimide films typically exhibit an inherent hysteresis due to the adsorption, absorption, diffusion, and desorption properties of the films. Also, such sensors often have a relatively large response time. What would be desirable is a humidity sensor that exhibits a relatively small amount of hysteresis (e.g. 2 Sigma hysteresis of 1% or less) and/or a faster response time.

SUMMARY

The disclosure generally relates to humidity sensors that exhibit a relatively small amount of hysteresis and/or a faster response time. In some cases, a humidity sensor may include a polymeric humidity sensing layer disposed over an electrode layer. The polymeric humidity sensing layer may include a halogenated layer disposed over the polymeric humidity sensing layer. In some instances, the polymeric humidity sensing layer may, for example, include a polyimide and the halogenated layer may include a monolayer or less than a monolayer of a halogenated material such as a fluorinated material.

In a particular example of the disclosure, a humidity sensor may include a substrate and an electrode layer that is supported by the substrate. In some cases, the electrode layer may define a first capacitive plate and a second capacitive plate. A non-halogenated humidity sensing layer may be disposed adjacent the electrode layer and may include a number of openings to increase an effective surface area of the non-halogenated humidity sensing layer. A halogenated layer may adjoin the non-halogenated humidity sensing layer.

In another example of the disclosure, a humidity sensor may include a substrate and an electrode layer that is supported by the substrate. In some cases, the electrode layer may define a first capacitive plate and a second capacitive plate. A polyimide humidity sensing layer may be disposed adjacent the electrode layer. In some instances, the polyimide humidity sensing layer includes a sensing surface and a thickness, and includes a number of openings formed within the sensing surface to increase an effective surface area of the sensing surface. In some cases, the sensing surface of the polyimide humidity sensing layer may be fluorinated to a depth that is less than the thickness of the polyimide humidity sensing layer, resulting in a fluorinated sensing surface.

In another example of the disclosure, a method of manufacturing a humidity sensor may include forming an electrode layer over a substrate. A non-halogenated polymeric material may be disposed over the electrode layer as a humidity sensing material. With the non-halogenated polymeric material disposed over the electrode layer, the non-halogenated polymeric material may be hydrogenated to increase the non-halogenated polymeric material's resistance to humidity sensing hysteresis.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE FIGURES

The disclosure may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

Figure 1:
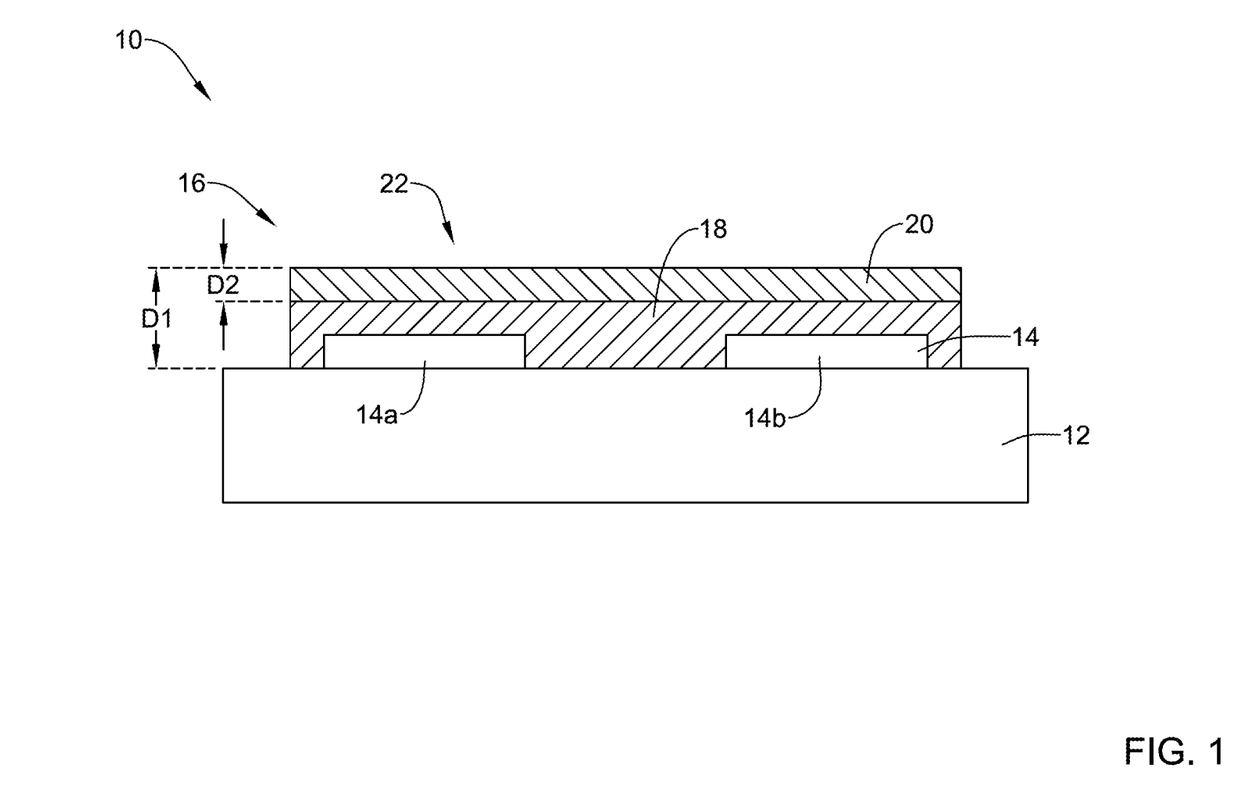
FIG. 1 is a schematic cross-sectional side view of an illustrative humidity sensor in accordance with an embodiment of the disclosure.

The following detailed description should be read with reference to the drawings in which similar structures in different drawings are numbered the same. The drawings, which are not necessarily to scale, depict illustrative embodiments and are not intended to limit the scope of the disclosure. FIG. 1 is a schematic cross-sectional side view of an illustrative humidity sensor 10, showing particular features of the humidity sensor 10. The illustrative humidity sensor 10 includes a substrate 12, which in some instances may be a silicon substrate, although other substrates may be used. The illustrative humidity sensor 10 includes an electrode layer 14. As drawn, the humidity sensor 10 is a plate-style humidity sensor in which the electrode layer 14 includes a pair of capacitive plates 14a and 14b. In some cases, however, the humidity sensor 10 may be an interdigitated style humidity sensor in which the electrode layer includes a pair of interdigitated electrodes, or any other suitable humidity sensor configuration as desired.

The illustrative humidity sensor 10 further includes a humidity sensing material 16 that in some cases may include a first layer 18 and a second layer 20. In some cases, the first layer 18 may be a polymer such as but not limited to a polyimide, a parylene, a benzocyclobutene, and divinylsiloxane bis(benzocyclobutene). In some cases, the first layer 18 may be a polyimide and the second layer 20 may be a halogenated layer that is deposited onto the first layer 18. In some cases, the second layer 20 may be a fluorinated layer, although other halogens such as chlorine and bromine may also be used.

In some cases, the second layer 20 may not be a separate layer, but may instead represent a fluorination of at least part of an outer surface of the first layer 18. In some instances, for example, the humidity sensing layer 16 may include a sensing surface 22 and an overall thickness that is indicated on FIG. 1 as a dimension $D_1$. The second layer 20 may represent a halogenated portion of the first layer 18, and may have a thickness (or perhaps thought of as a halogenation depth) that is indicated as a dimension $D_2$. In some cases, the second layer 20 may represent a portion of the first layer 18 that has been fluorinated to a depth $D_2$ that is less than the thickness $D_1$ of the first layer 18.

In some cases, the second layer 20, representing a halogenation such as fluorination of the sensing surface, may be considered as forming a mono-layer or in some cases a partial mono-layer of the halogen such as fluorine. In some cases, the sensing surface 22 may, for example, be fluorinated by plasma deposition of $C_xH_yF_z$ onto the polyimide humidity sensing layer 16, where x is an integer ranging from 1 to 4, y is an integer ranging from 0 to 2 and z is an integer ranging from 2 to 8. In some instances, the sensing surface 22 may be fluorinated via plasma deposition of one or more of $CF_4$, $C_2F_6$, $C_4F_8$, $CHF_3$ and $CH_2F_2$. In some cases, there may be some displacement of hydrogen within the sensing surface 22. In some cases, particularly during plasma deposition of $C_xH_yF_z$, there may be deposition of a heterogeneous mixture of fluorocarbons and hydrofluorocarbons on the sensing surface 22.

Figure 2:
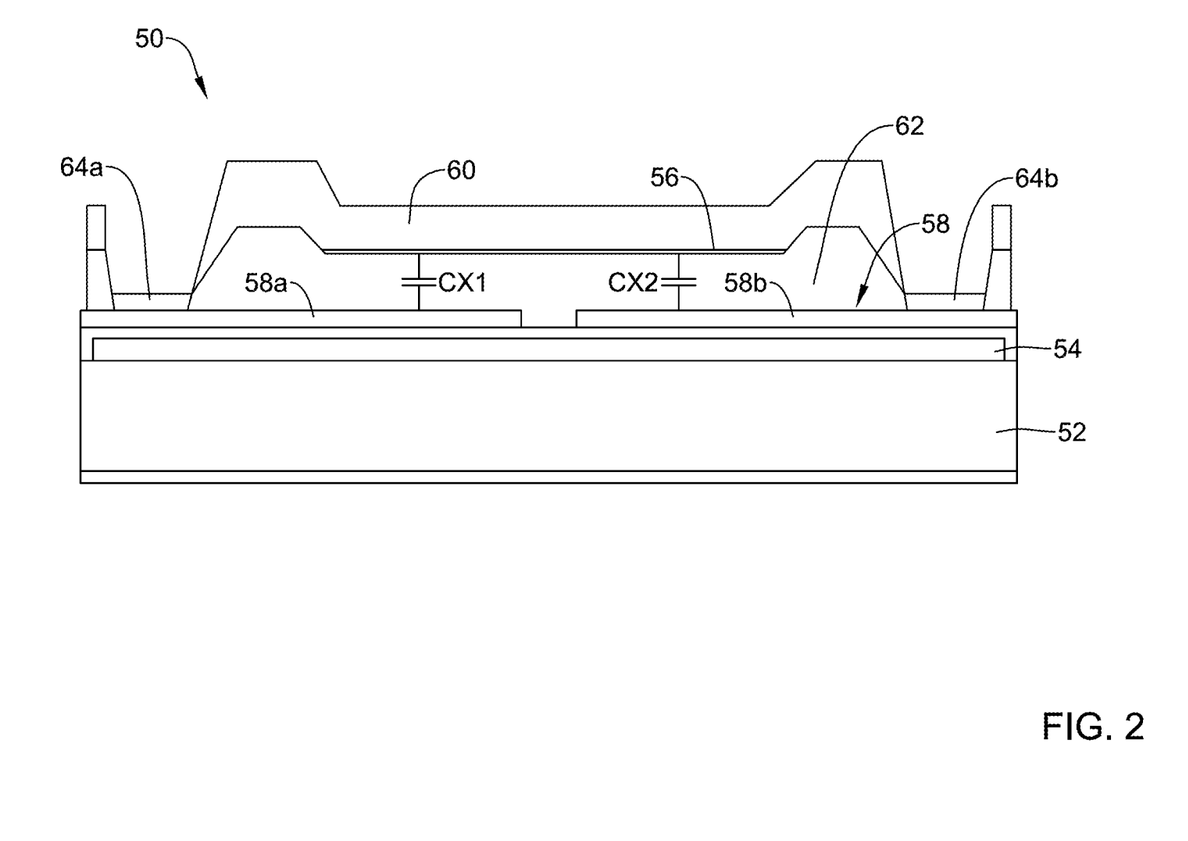
FIG. 2 is a cross-sectional side view of an illustrative humidity sensor in accordance with an embodiment of the disclosure.
Figure 3:
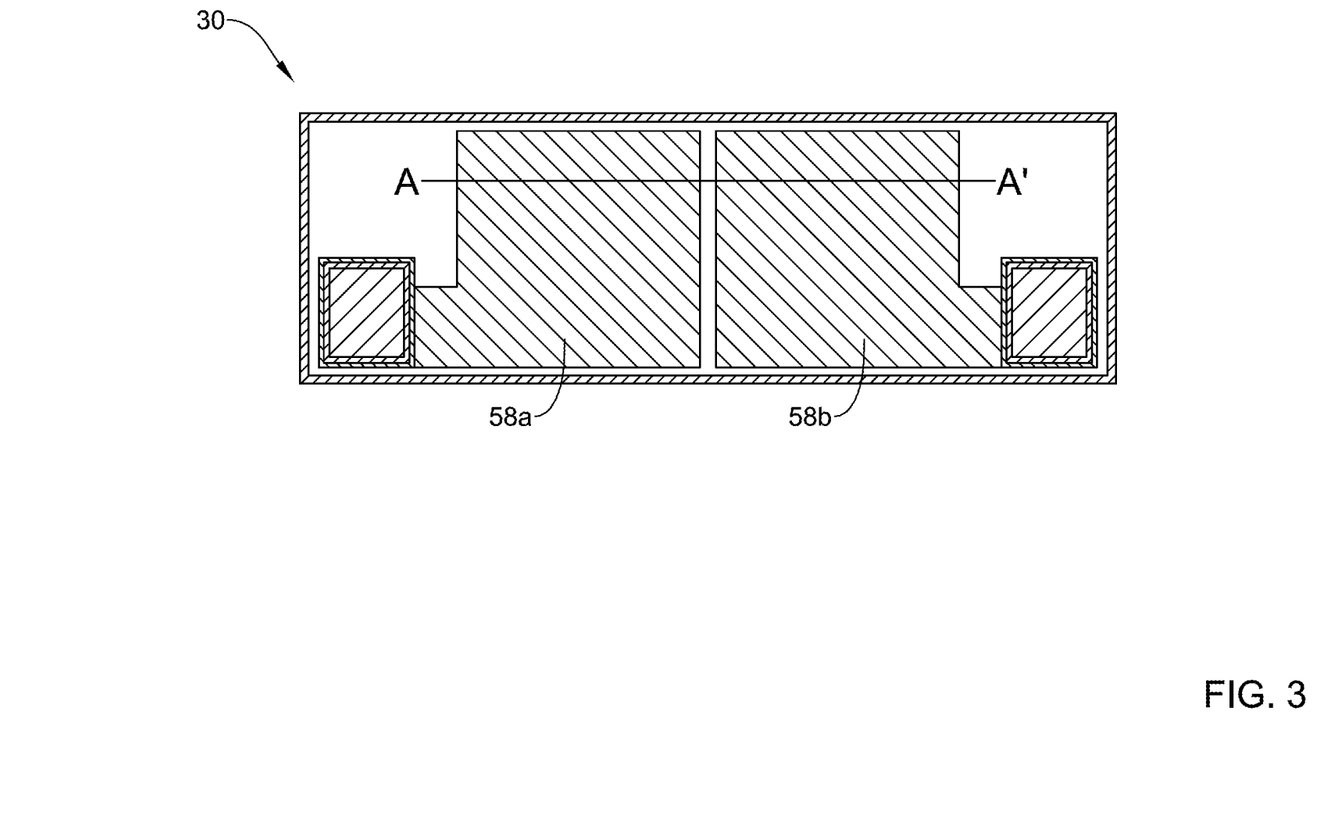
FIG. 3 is a top view of a plate-type humidity sensor, with the humidity sensing material not shown to reveal the electrodes.

FIG. 2 is a side view of an illustrative humidity sensor 50. As illustrated, the humidity sensor 50 is a plate-style humidity sensor. The illustrative humidity sensor 50 includes a substrate 52 and a dielectric layer 54 disposed on the substrate 52. In some cases, the substrate 52 may be silicon and the dielectric layer 54 may, for example, be $SiO_2$. A porous platinum layer 56 forms a common plate that is shared by two series capacitors CX1 and CX2. Layer 58 is a patterned layer that forms the other plates of capacitors CX1 and CX2. For example, layer 58 may be patterned as illustrated in FIG. 3 to form a capacitor plate 58A for capacitor CX1 and a separate capacitor plate 58B for capacitor CX2. Capacitor plate 58A may be electrically connected to gold pad 64A and capacitor plate 58B may be electrically connected to gold pad 64B. In some cases, the layer 58 may be a titanium tungsten alloy. A passivation layer 60 may be formed over the porous platinum layer 56, and may be a polyimide, for example. A dielectric layer 62 is provided between the porous platinum layer 56 and the titanium tungsten alloy layer 58 and in some cases functions as the humidity sensing layer. The dielectric layer 62 may be halogenated or include a halogenated layer such as a fluorinated layer. Gold pads 64A and 64B permit electrical connections to be made to the humidity sensor 50.

Figure 4:
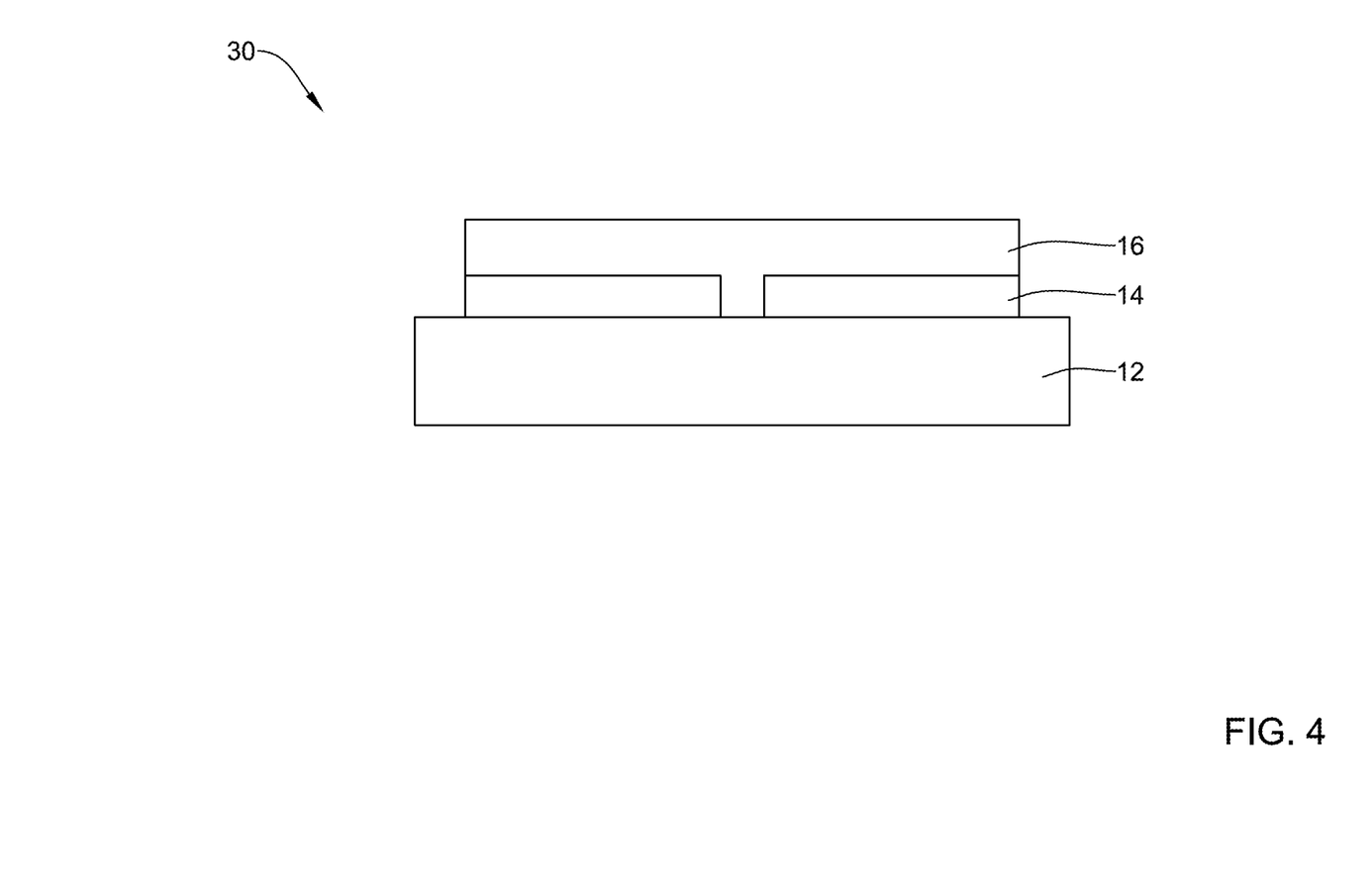
FIG. 4 is a schematic cross-sectional side view of the humidity sensor of FIG. 3 taken along line A-A', showing the humidity sensing material.
Figure 5:
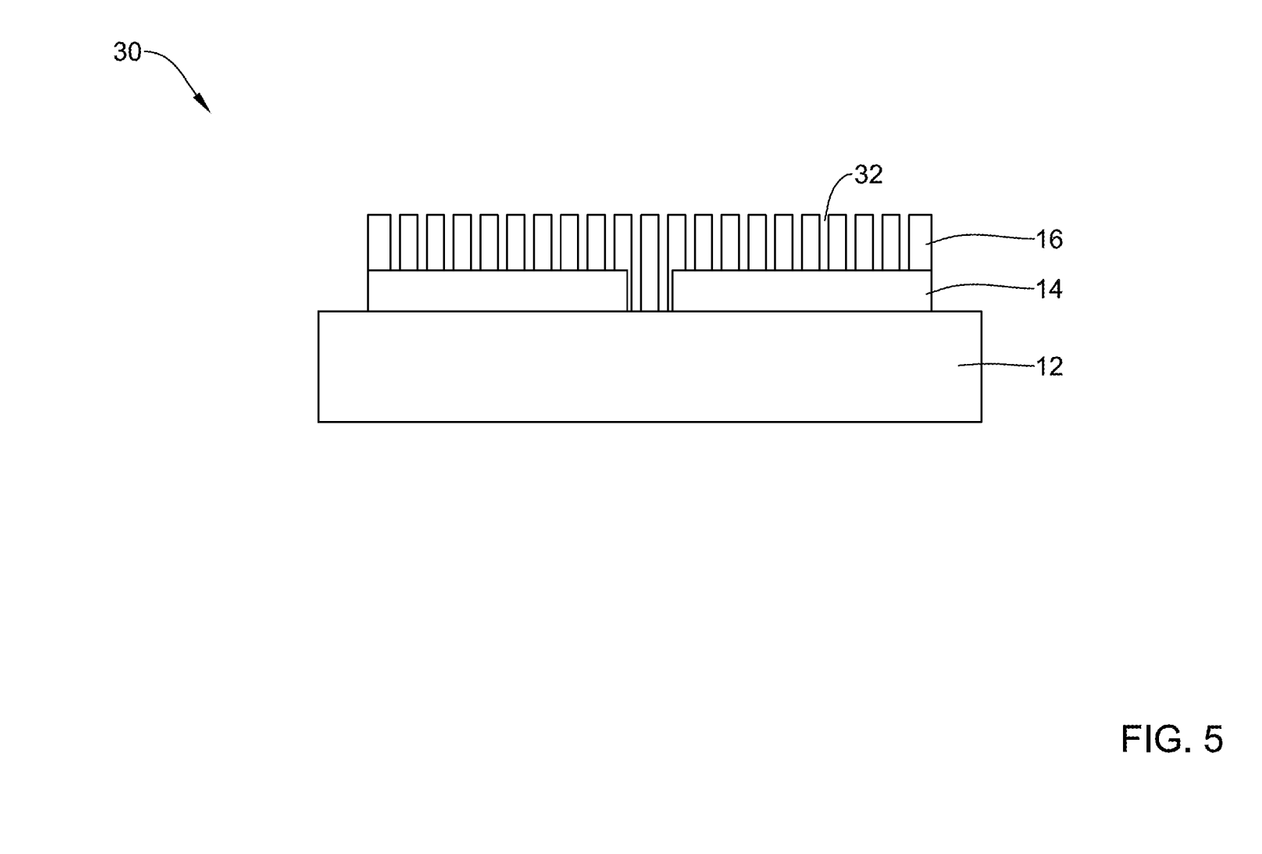
FIG. 5 is a schematic cross-sectional side view of the humidity sensor of FIG. 3 taken along line A-A', after additional processing of the humidity sensing material.
Figure 6:
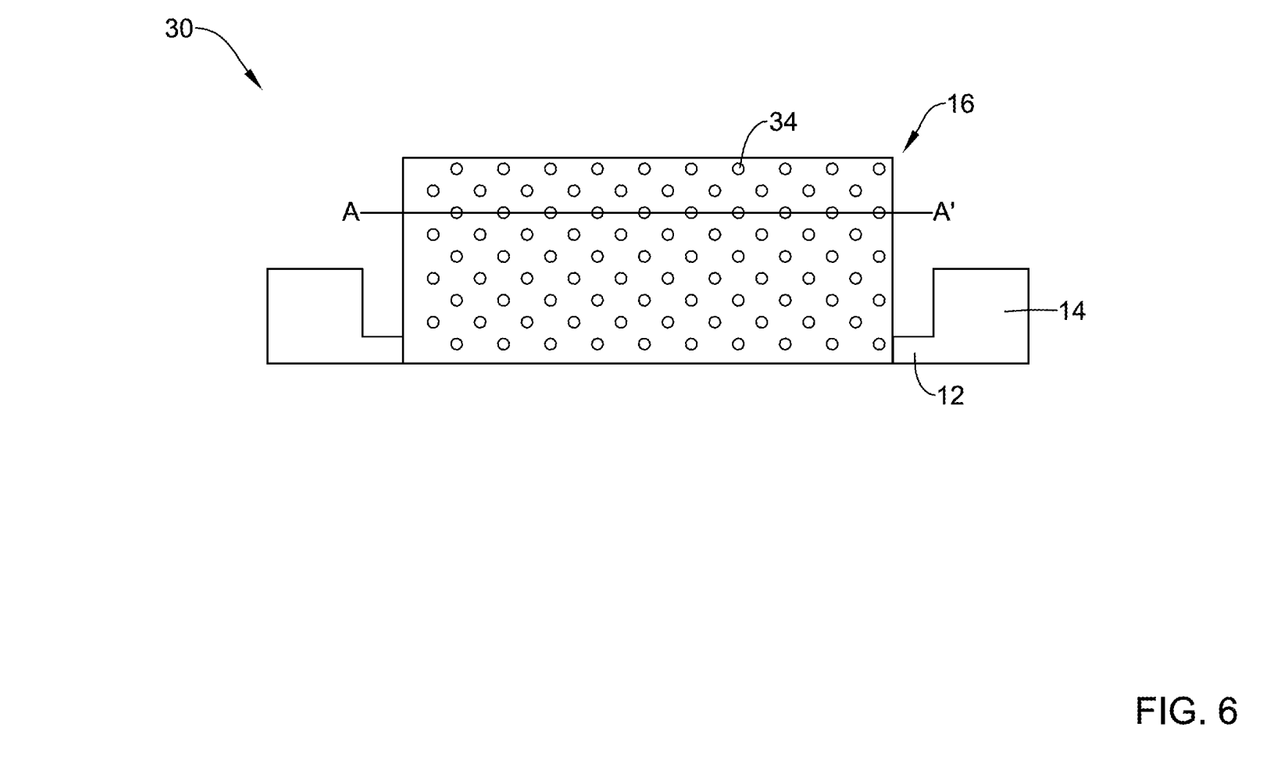
FIG. 6 is a top view of the humidity sensor of FIG. 5.
Figure 7:
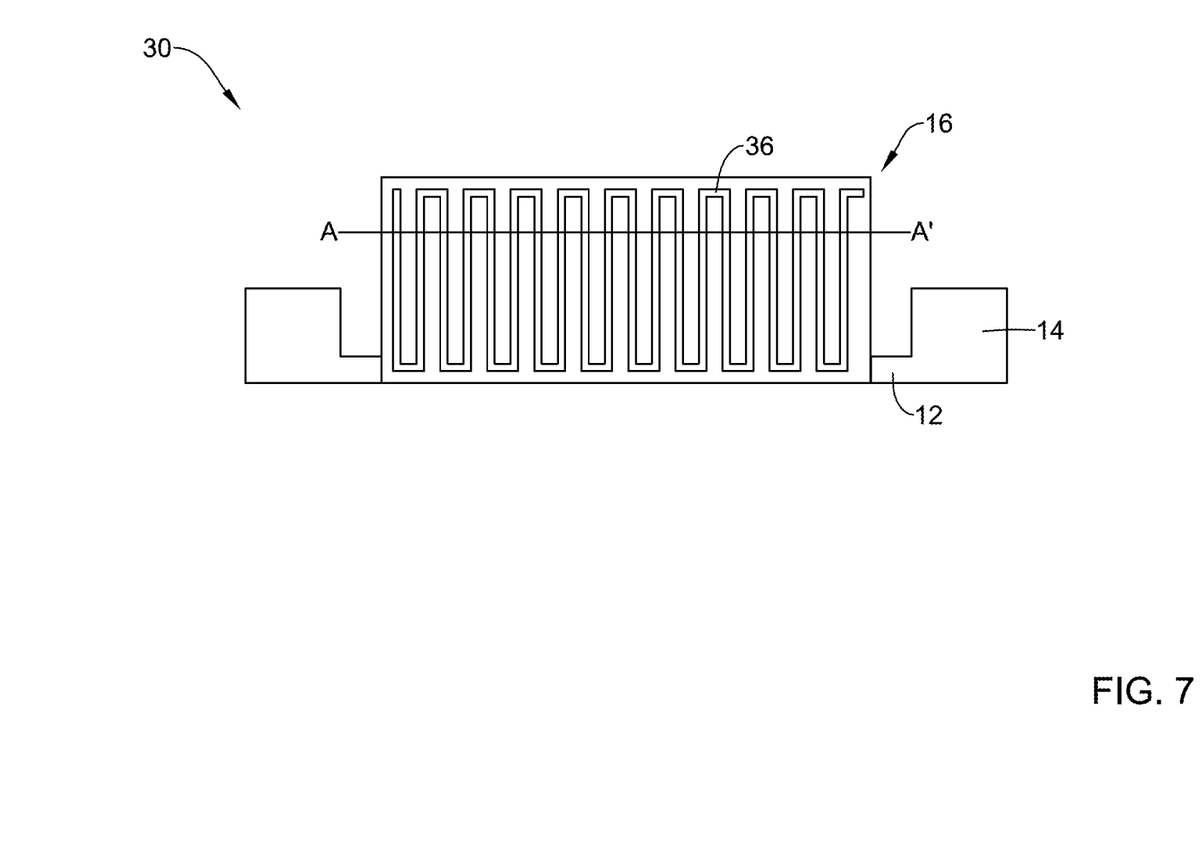
FIG. 7 is an alternate top view of the humidity sensor of FIG. 5.

FIGS. 3 through 10 provide additional examples of humidity sensors. FIG. 3 is a top view of a plate-type humidity sensor 30, with the humidity sensing material not shown to reveal the electrode layer 14, while FIG. 4 is a schematic cross-sectional side view of the humidity sensor of FIG. 3 taken along line A-A', illustrating a sequence of the substrate 12, the electrode layer 14 and the humidity sensing material 16. FIG. 5 is a schematic cross-sectional side view of the humidity sensor of FIG. 3 taken along line A-A', after additional processing of the humidity sensing material to create pores. In FIG. 5, openings 32 have been formed in the humidity sensing material 16 to increase the porosity and thus the effective surface area of the humidity sensing material 16. This may increase the sensitivity of the humidity sensor. FIG. 6 is a top view of the humidity sensor 30 of FIG. 5, illustrating that the openings 32 of FIG. 5 may include a plurality of pores 34 formed within the humidity sensing material 16. FIG. 7 is an alternate top view of the humidity sensor 30 of FIG. 5, illustrating that the openings 32 of FIG. 5 may include one or more elongated channels 36 formed within the humidity sensing material 16.

Figure 8:
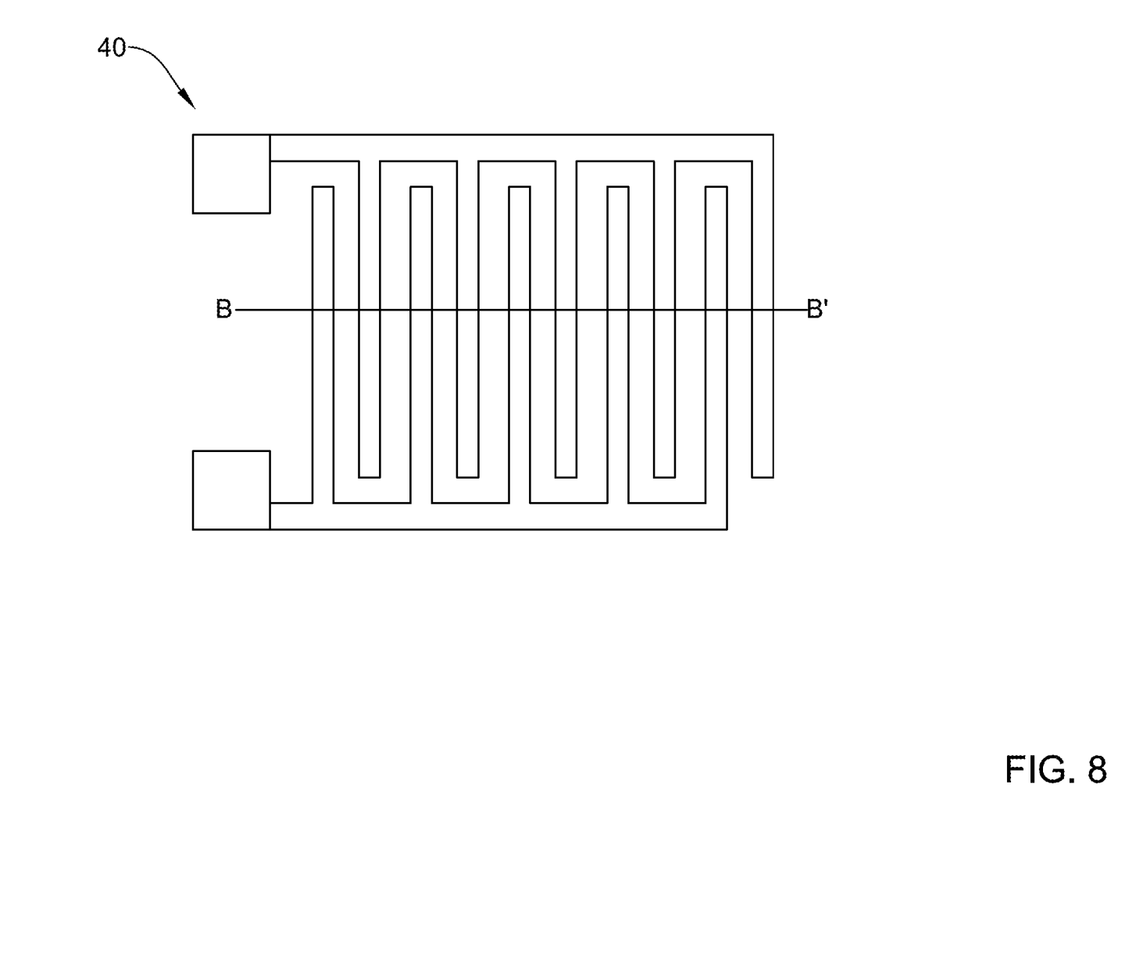
FIG. 8 is a top view of an interdigitated humidity sensor.
Figure 9:
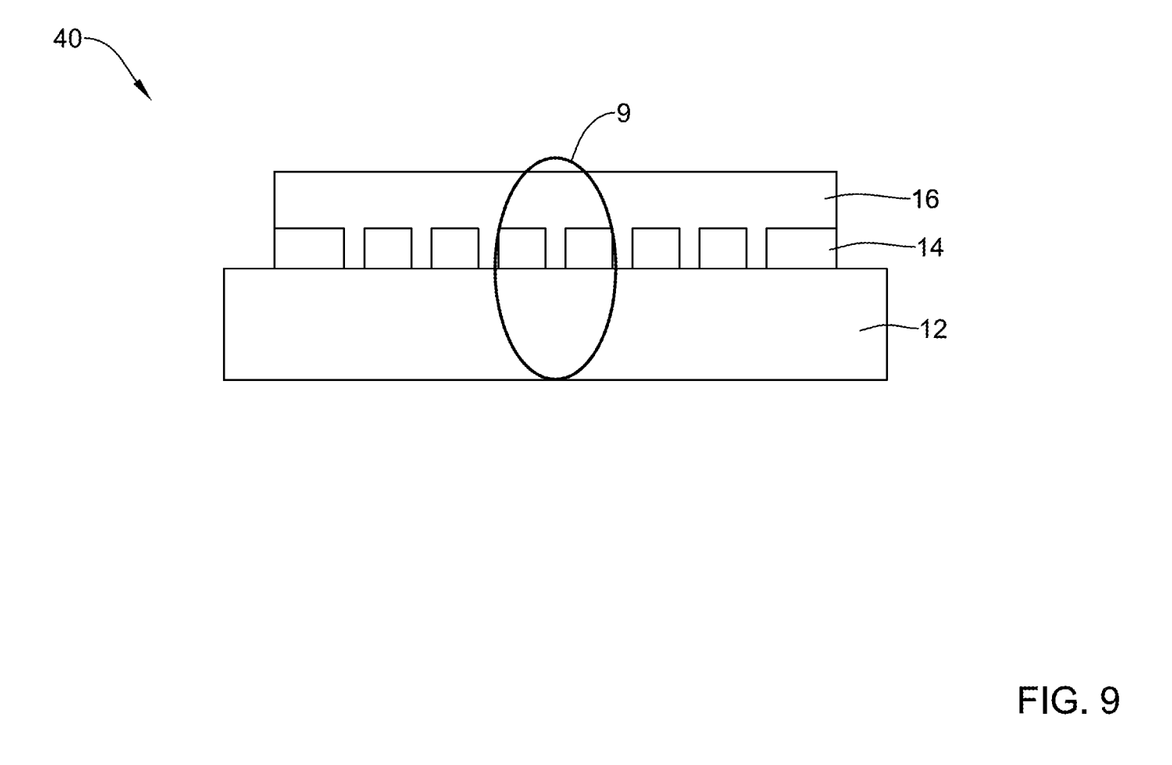
FIG. 9 is a schematic cross-sectional side view of the humidity sensor of FIG. 8 take along line B-B'.
Figure 10:
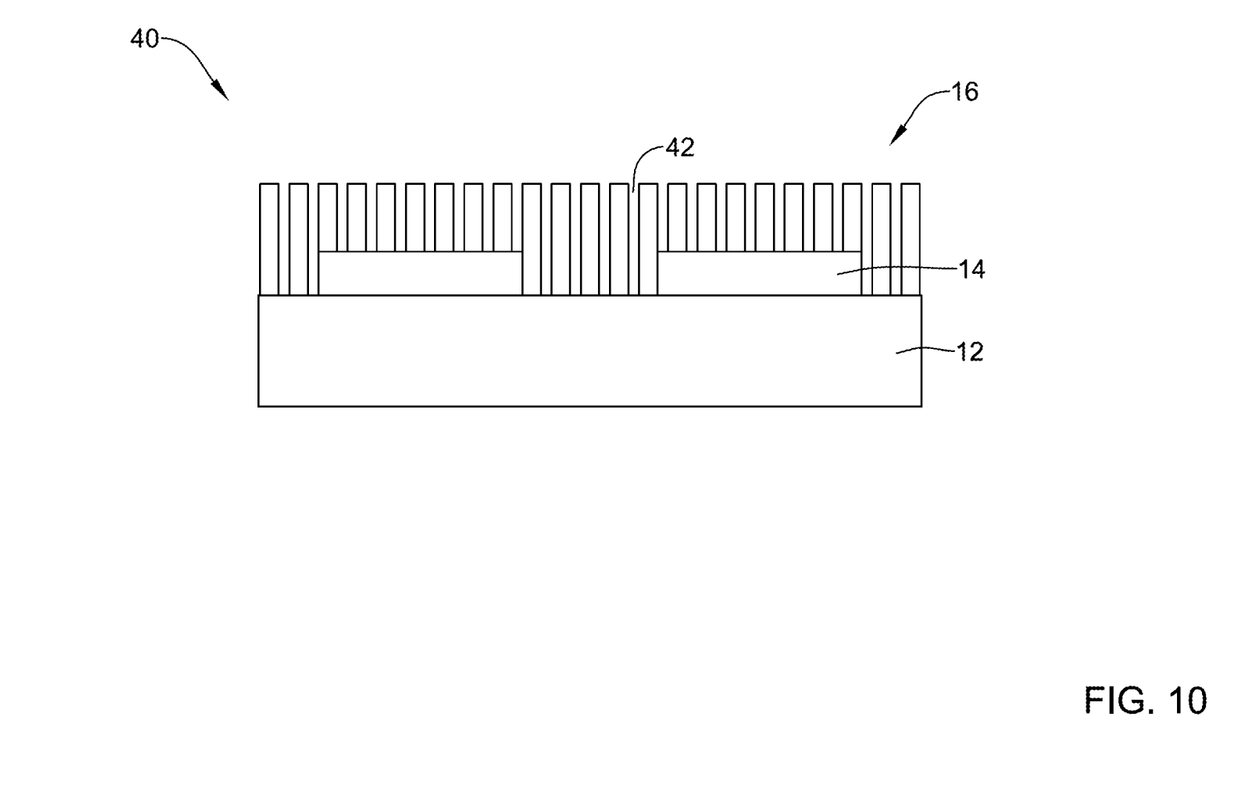
FIG. 10 is an enlarged cross-sectional side view of a portion of FIG. 9 after additional processing of the humidity sensing material.

FIG. 8 is a top view of an interdigitated humidity sensor 40, while FIG. 9 shows a schematic cross-sectional side view of the interdigitated humidity sensor 40 of FIG. 8 taken along line B-B' illustrating the sequence of a substrate 12, an electrode layer 14 and a humidity sensing material 16. As can be seen, in this example, the electrode layer includes two interdigitated electrodes. FIG. 10 is an enlarged cross-sectional side view of a portion of the interdigitated humidity sensor 40 of FIG. 9 after additional processing of the humidity sensing material 16. In FIG. 10, openings 42 have been formed in the humidity sensing material 16 to increase the porosity and thus the effective surface area of the humidity sensing material 16. This may increase the sensitivity of the interdigitated humidity sensor.

Figure 11:
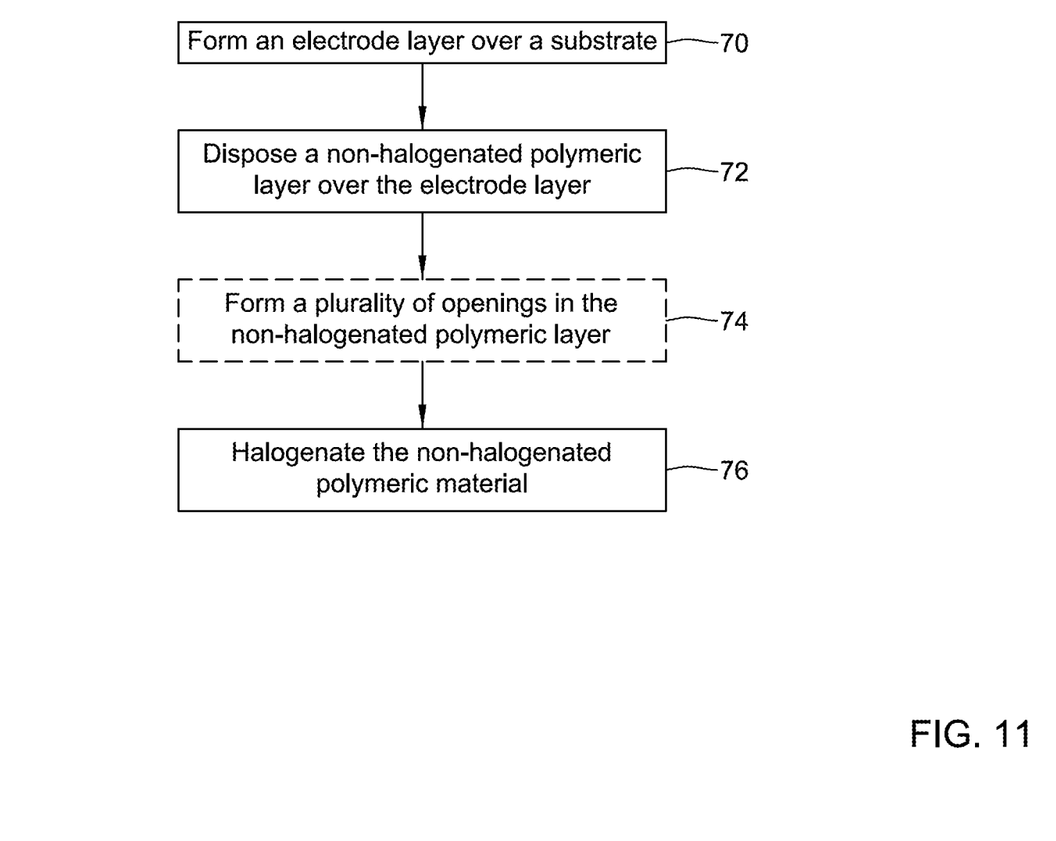
FIG. 11 is a flow diagram illustrating an illustrative method for making a humidity sensor.

FIG. 11 is a flow diagram showing an illustrative method of manufacturing a humidity sensor such as the humidity sensor 10 (FIG. 1), the humidity sensor 30 (FIG. 3), the humidity sensor 40 (FIG. 8) or the humidity sensor 50 (FIG. 2). As generally indicated at block 70, an electrode layer may be formed over a substrate. In some cases, the electrode layer may be formed directly on the substrate while in other cases there may be one or more intervening layers. A non-halogenated polymeric layer may be disposed over the electrode layer, as generally seen at block 72. In some cases, the non-halogenated polymeric layer may be a non-halogenated polyimide layer. In some cases, as optionally shown at block 74, a plurality of openings, such as channels, pores or other void spaces, may be formed within the non-halogenated polymeric layer.

Next, as generally indicated at block 76, the non-halogenated polymeric layer may be halogenated. In some cases, halogenating the non-halogenated polymeric layer may include a chemical reaction and/or a thermal reaction, such as in a plasma environment. In some cases, halogenating the non-halogenated polymeric material may include an ion implantation process. In some cases, halogenating the non-halogenated polymeric material may include fluorinating the non-halogenated polymeric material, and may for example result in an organofluorine thin film disposed on the non-halogenated polymeric material.

In some cases, the humidity sensing material may include, beyond those already discussed, a polymer film (polyimides, benzocyclobutene, nylons, etc.), an organosilicate film (Si—O—C polymers, divinylsiloxane bis (benzocyclobutene), etc.), and/or an inorganic film that has been halogenated, such as with fluorine, chlorine or bromine, and/or coated with a halogenated thin film such as a perfluorocarbon or an organofluorine (CxFy) thin film. By halogenating and/or coating the humidity sensing material, the capacitive and/or resistive hysteresis effect of the humidity sensor may be diminished compared to a humidity sensor that uses an untreated humidity sensing material. In general, halogenating the humidity sensing material may make the humidity sensing material more hydrophobic, and thus less susceptible to hysteresis. Fluorination is a favorable method of halogenation due to the availability of a large number of fluorine sources within a typical microelectronics fabrication facility, although chlorine and bromine are also available for use. In some cases, the humidity sensing material may be first etched or otherwise processed to increase its effective surface area before halogenating and/or coating the humidity sensing material. It is contemplated that the halogenation may extend into etched pores, holes, trenches and/or other etched features.

As noted above, the humidity sensing material may include, for example, polyimide s, parylene s, benzocyclobutene s, polyethersulfone, celluloseacetatebutyrate, poly (methyl methacrylate), and/or any other suitable humidity sensing material. Such humidity sensing materials may be improved by modifying their surface. In some cases, the humidity sensing material may be improved by either directly halogenating the humidity sensing material or by depositing an organofluorine (CxFy) thin film on the humidity sensing material. The deposited organofluorine thin film may be on the order of a single monolayer to many monolayers, as desired. It is contemplated that other halocarbons such as haloalkanes may be used to form hydrophobic surfaces. This can be accomplished by one or a combination of chemical reaction, ion implantation and deposition.

The chemical reaction of fluorine with organic and organosilicate humidity sensing materials can be accomplished with a variety of chemicals. A simple way to create reactive fluorine is in a plasma environment using fluorine containing gases such as $F_2$, $NF_3$, anhydrous HF, $SiF_4$, $ClF_3$, and $XeF_2$. In some cases, these gases may be blended with inert diluents such as Ar, He, and $N_2$ to improve the production of fluorine radicals. Most plasma etch and plasma chemical vapor deposition systems control the temperature of the processed substrate in order to allow for control of the chemical reaction between the fluorine and the humidity sensing material. In some cases, downstream plasmas may be used to eliminate ion interactions with the substrate of the humidity sensor, thus allowing for purely chemical interactions. It is also possible to fluorinate surfaces of polymer films with $XeF_2$ vapors. The SPTS Xactix tool, for example, is specifically built for $XeF_2$ reactions and is used within MEMS manufacturing.

Ion implantation of fluorine and fluorinated species into the humidity sensing material is also contemplated. For the organic films, low energy ions may be used to keep the ions near the surface of the humidity sensing material. Ion implanters typically use $BF_3$ to implant boron. In fact, ions of $BF_2$ are implanted into the silicon. This can be done by plasma immersion ion implantation. One commercially available tool that produces low energy ions is the Varian VIISta PLAD. Higher energy ions are also possible with other implanters that are configured to directly implant F-ions or $BF_x$-ions into the humidity sensing material. Since these tools typically handle a fluorinated species they can also be plumbed with $NF_3$, $SF_6$, $F_2$, HF, and $SiF_4$. After implantation, the humidity sensing material can be annealed/heat treated in a conventional furnace to allow additional chemical reactions and diffusion of the fluorine.

Deposition of $C_xF_y$ and $C_xH_yF_z$ type materials is possible in plasma etch and plasma enhanced CVD tools. Under appropriate conditions, deposition of these species is possible with, for example, one or more of the following gases: $CF_4$, $C_2F_6$, $C_4F_8$, $CHF_3$, $CH_2F_2$, $C_3F_8$, $C_4F_6$, and $C_5F_8$. Additives and diluents may including $O_2$, He, $N_2$, Ar, $H_2$, $NF_3$, $SF_6$, $XeF_2$, $ClF_3$, $F_2$, $SiF_4$, and/or HF may be added to the fluorocarbon gases in order to modify the chemical species available for deposition. Other halocarbons can be formed by the above processes using other halogenated gases commonly found in a microelectronics or MEMS fabrication facility, such as HCl, $Cl_2$, HBr, $ClF_3$, HI, $BCl_3$, and $BBr_3$. In some cases, all three interactions may take place in plasma-based tools.

In one example of the disclosure, divinylsiloxane bis (benzocyclobutene) (DVS-bis-BCB) is etched in $O_2+F_2$ plasma which modifies the surface and bulk material properties of BCB. Optimizing the ratio of $O_2$ and $F_2$ may provide greater control of the etch rate of DVS-bis-BCB and the film thickness. DVS-bis-BCB has good adhesion properties and should adhere better than polyimide when exposed to chemical cleaners such as ammonia.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A humidity sensor comprising:

a substrate;

an electrode layer supported by the substrate, the electrode layer defining a first capacitive plate and a second capacitive plate;

a polyimide humidity sensing layer adjacent the electrode layer, the polyimide humidity sensing layer including a sensing surface and a thickness, and further including a number of openings formed within the sensing surface to increase an effective surface area of the sensing surface; and the sensing surface of the polyimide humidity sensing layer being fluorinated to a depth that is less than the thickness of the polyimide humidity sensing layer, resulting in a fluorinated sensing surface, wherein the electrode layer is adjacent a first side of the polyimide humidity sensing layer, and a porous platinum layer is adjacent a second opposing side of the polyimide humidity sensing layer, wherein the porous platinum layer in combination with the first capacitive plate and the second capacitive plate form a first capacitor and a second capacitor.

2. The humidity sensor of claim 1, wherein the fluorinated sensing surface is fluorinated by plasma deposition of $C_xH_yF_z$ onto the polyimide humidity sensing layer, where x is an integer ranging from 1 to 4, y is an integer ranging from 0 to 2 and z is an integer ranging from 2 to 8.

3. The humidity sensor of claim 2, wherein the $C_xH_yF_z$ comprises one or more of $CF_4$, $C_2F_6$, $C_4F_8$, $CHF_3$ and $CH_2F_2$.

4. The humidity sensor of claim 1, wherein the fluorinated sensing surface comprises a monolayer or a partial monolayer.

5. The humidity sensor of claim 1, wherein the fluorinated sensing surface comprises a heterogeneous mixture of fluorocarbons and hydrofluorocarbons.

* * * * *